March 30, 1954      S. K. WELLMAN      2,673,480

APPARATUS FOR SHAPING BIMETALLIC ARTICLES

Original Filed Sept. 21, 1944      4 Sheets-Sheet 1

INVENTOR:
Samuel K. Wellman
BY C. Thomas Cox

INVENTOR:
Samuel K. Wellman
BY
C. Thomas Cox
ATTORNEY

INVENTOR:
Samuel K. Wellman
BY C. Thomas Cox
Attorney

INVENTOR:
Samuel K. Wellman
BY
C. Thomas Cox

Patented Mar. 30, 1954

2,673,480

UNITED STATES PATENT OFFICE 2,673,480

APPARATUS FOR SHAPING BIMETALLIC ARTICLES

Samuel K. Wellman, Cleveland Heights, Ohio, assignor to The S. K. Wellman Company, Cleveland, Ohio, a corporation of Ohio Original application September 21, 1944, Serial No. 555,116, now Patent No. 2,607,246, dated August 19, 1952. Divided and this application August 21, 1946, Serial No. 692,064

1 Claim. (Cl. 80—56)

This invention relates to an apparatus for imparting a curved shape to bimetallic articles of the type having a sintered metal facing layer integrally bonded to the face of a reinforcing member or backing of solid metal, such as steel or copper.

Bimetallic articles of the type referred to are produced by pressing or briquetting metal powder of suitable composition and containing minor amounts of nonmetallic ingredients, such as graphite, and then heating the briquette so formed to a sintering temperature. Since the sintered metal is rather porous and of low tensile strength, it is desirable to provide a reinforcing member or backing of stronger metal, and this is accomplished by conducting the heating or sintering step with the briquette held against a properly prepared surface of a backing member. The heat of the sintering step causes the pressed powder to sinter together and to integrally bond to the backing member thus forming a bimetallic article having a sintered metal facing layer integrally bonded to the face of a solid metal backing member. The term "sintered metal facing" is used to refer to facings produced by pressing and sintering a predominately metallic mixture of metallic and non-metallic powders.

Bimetallic articles of this type have found extensive use as rubbing surfaces in heavy-duty applications, as for example, friction members for clutches and brakes and bearings for shafts. A typical mixture of powders comprises:

| | Parts by weight |
|---|---|
| Copper | 67.26 |
| Sn | 5.31 |
| Pb | 8.72 |
| Fe | 7.20 |
| C | 7.08 |
| $SiO_2$ | 4.42 |

This mixture may be briquetted at a pressure of about 11 tons per square inch and assembled on a prepared steel backing member and heated to a temperature of about 1450° F. under a pressure of about 100 pounds per square inch. The steel backing member may be of S. A. E. 1030 composition and must be suitably prepared before the heating operation. One method of preparation is disclosed in Swartz Patent No. Re. 22,282.

The necessity of pressing the powder to form the briquette and of pressing the briquette against the backing during the sintering and bonding step limits the process, as a practical matter, to the production of articles of flat configuration since it is difficult to press the powder to a curved shape and avoid uneven pressure and density. However, it is frequently desirable to produce bimetallic articles of curved form so that they can be used for shaft bearings or for brake shoes adapted to engage a cylindrical or conical surface. Thus, it is customary to shape or bend a flat bimetallic strip to curved shape by use of a bending press and suitable dies. If the flat bimetallic strip is to be bent so that the sintered facing will be disposed on the inside of the curved strip, there is relatively little difficulty in accomplishing this in a press using a suitably shaped die. However, attempts to use a press and die to bend the bimetallic article so that the sintered facing is disposed on the outside of the curve or on the convex face of the backing member for use in an internal expanding brake, for example, have not been very successful. The sintered facing of an article so bent is deeply cracked, due probably to the low tensile strength of the sintered layer.

Other and more satisfactory methods for bending such articles to a shape having the sintered facing disposed on the outside have been developed and one such method is described in Wellman Patent No. 2,289,311, issued July 7, 1942. According to this patent, the flat bimetallic article is provided with a thin sheet metal reinforcing member which is integrally bonded to the sintered facing, forming in effect a sandwich with the sintered material disposed between the thin sheet metal facing and the thicker solid metal backing member. When such a sandwich article is bent in a press, the thin sheet metal facing stretches and holds the sintered layer together, minimizing the cracking of the sintered layer. After being bent, the thin metal facing is stripped or peeled off leaving a sintered face that is substantially free from cracks. This process, of course, is rather time consuming and expensive.

An improved process for bending such bimetallic articles to curved formation is disclosed in copending applications S. N. 507,429, filed October 23, 1943, of Francis J. Lowey, now Patent No. 2,446,892 issued August 10, 1948, and S. N. 520,162, filed January 29, 1944, of Charles H. Tower and Francis J. Lowey, now Patent No. 2,446,891 issued August 10, 1948. These applications teach that the bending of a flat bimetallic article may be successfully accomplished by controlled directional working of the sintered metal facing. Preferably, this is accomplished by passing the bimetallic article between a pair of opposed pressure rolls in order to compress and elongate the sintered facing. This elongation of the facing results in controlled bending of the bimetallic article.

The bending of the bimetallic blank is apparently due to the fact that the sintered facing is elongated, while the less plastic backing member of steel is not elongated to any appreciable extent. This elongation of one layer only of a bimetallic article in which the two layers are firmly united obviously results in bending of the article. Thus, in a bimetallic blank having a sintered facing composed predominantly of copper bonded to a solid steel backing member, the progressive mechanical working will result in considerable elongation of the sintered facing without elongating the backing and a consequent bending of the blank to curved shape with the sintered facing disposed on the outer or convex side of the backing.

The terms plastic and plasticity may be used to indicate the flowable or deformable properties of the sintered material which permit the elongation and cause the bending. While sintered metallic material is generally of low tensile strength in comparison with solid metal, such as steel, it does possess the property of being plastic or flowable to a rather high degree. In this respect, it may be said that it is of high ductility in that it is capable of being deformed and hammered out.

This method is applicable to the controlled bending of any bimetallic blank which has layers of different plasticity, but it is primarily applicable to bimetallic articles having a sintered metal facing bonded to a solid metal backing member and in which the facing is of greater plasticity than the backing, as is the usual case. It may be practiced on bimetallic articles in which both layers are of solid metal or on articles in which a sintered metal facing of relatively low plasticity, such as an iron-base mixture, is bonded to a backing member of higher plasticity, such as copper. In all of these cases, controlled directional working of the bimetallic article will cause it to assume a curved shape with the more plastic layer disposed on the outer or convex side of the backing. In the case where a sintered iron-base mix is secured to a backing member of copper, the bending will be in reverse direction and the sintered layer will be disposed on the inner or concave side of the backing. The bending of these latter articles by this method is not of major importance since it is relatively easy to form such shapes in a bending press.

This invention is, therefore, primarily directed to apparatus for the accurate bending to shape of a bimetallic blank of the type having a sintered metal facing bonded to a less plastic backing member of solid metal. By the term "sintered metal," I intend to include not only layers made from metal powders by means of pressing and sintering, but also layers made by spraying metal onto a backing member and then sintering the same to increase the strength of the article.

The copending applications referred to generally disclose the controlled bending of bimetallic blanks, but they contemplate the use of pressure rolls which are rigidly held in the desired position, so as to have a constant spacing apart of the rolls and a constant applied pressure to uniform articles. While this method achieves greatly improved results, some difficulties have arisen with bimetallic articles in which the facing is of nonuniform thickness or density. It is apparent that with the rolls spaced a constant distance apart any longitudinal variation in thickness, density, or plasticity of the blank will result in variations in the degree of bending. My invention makes use of the discovery that the effect of such variations may be avoided if the rolls are urged toward one another under a constant and predetermined pressure and the spacing apart of the rolls is merely controlled by the thickness and density of the blank.

The underlying theory of the operation is not too clearly understood but, as indicated above, I believe that the progressive mechanical working of successive lateral areas of the sintered facing of the bimetallic blank results in controlled and progressive elongation of the areas and the resultant bending of the blank. If the blank is longitudinally of varying density and/or thickness, the use of constant pressure, according to my invention, apparently serves to greatly reduce or eliminate the effect of such variations. It appears that this constant pressure serves to insure that successive lateral areas are subjected to the same degree or amount of mechanical working and thus elongate longitudinally to the same degree.

It is an object of the invention to provide a new and improved apparatus with which bimetallic articles having layers of different plasticity may be accurately and rapidly bent, curved, or otherwise formed to the desired shape.

It is a further object of the invention to provide new and improved apparatus for bending bimetallic articles and characterized by the use of opposed pressure rolls which are urged toward each other by a predetermined constant yet yieldable pressure.

It is also an object of the invention to provide apparatus such as last referred to above in which means are provided for applying a large yieldable pressure to one of the pressure rolls by the use of compressed air with a minimum danger of air leakage, and in which the pressure applying means is sensitive to change in resistance offered by a work piece to the rolls.

It is a further object of the invention to provide a new and improved apparatus for bending bimetallic articles which are longitudinally of non-uniform density and/or thickness characterized by novel means for mechanically working to the same degree successive lateral areas of the facing of the bimetallic article.

Other and further objects and advantages of my invention will be apparent from the following description and the accompanying drawings, in which.

Figure 1:
Fig. 1 is a plan view, on a reduced scale, of a flat bimetallic blank which is to be bent to cylindrical shape.
Figure 2:
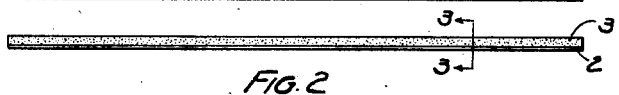
Fig. 2 is a side elevation of the blank of Fig. 1.
Figure 3:
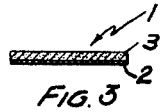
Fig. 3 is a vertical section on line 3—3 of Fig. 2.
Figure 4:
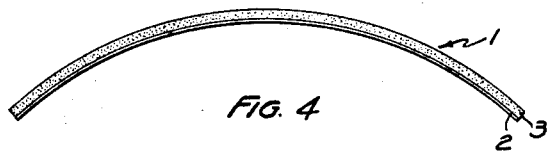
Fig. 4 is a side elevation of the blank of Figs. 1 to 3 after it has been formed to shape in accordance with the teachings of my invention.
Figure 14:
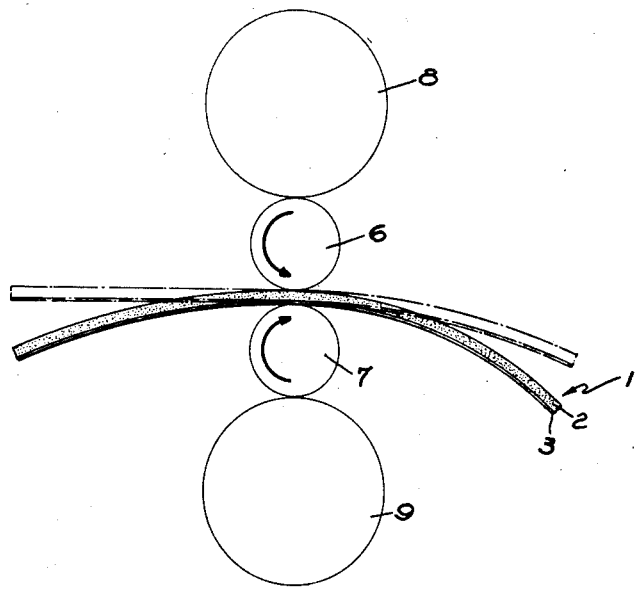
Fig. 14 is a diagrammatical showing of apparatus suitable for shaping the blank of Figs. 1 to 3.

By my invention I propose to take the flat blank 1 shown in Figs. 1 to 3 and bend it to a curved formation as shown in Fig. 4 with the sintered facing 3 disposed on the outer or convex face of the steel backing member 2. This I accomplish by passing the bimetallic blank 1 between a pair of opposed pressure rolls. Thus, referring to Fig. 14, which diagrammatically illustrates the bending operation, the bimetallic blank 1 is shown in position between a pair of opposed pressure rolls 6 and 7. In this figure, the blank 1 is shown as traveling from the left to the right of the figure. The dotted lines show the position of the blank at its mid-point in its first pass between the rolls and with the right side of the blank partially curved. In its solid-line position, the partially curved blank is shown in its second pass between the rolls and the right side of the blank is shown as having achieved the final and desired curvature. In this figure, the pressure rolls 6 and 7 are shown provided with backing rolls 8 and 9 which serve to hold the pressure rolls 6 and 7 in place and to rotate them.

As is disclosed in the said copending applications above referred to, the degree of curvature achieved will be dependent upon the relative density, thickness, and plasticity of the facing 2 and the backing 3, the relative thickness of these two parts and the speed, diameter, and pressure applied by the rolls. The progressive mechanical working achieved by the rolls 6 and 7 causes the less dense facing layer to be compressed and elongated resulting in curvature of the blank. While there are many factors affecting the bending operation, the major item controlling the extent of bending is the extent of mechanical working by the rolls. This in turn is dependent on the density and thickness of the facing and the amount of pressure applied to the rolls. For any given bimetallic article, the degree of bending is proportional to the degree of working and thus bending to a smaller radius merely requires the use of a greater pressure on the pressure rolls to obtain a greater elongation of the sintered facing. This mechanical working obviously results in a slight decrease in thickness of the facing layer, but this can easily be accommodated for by using an initially thicker article than that desired after bending.

Figure 5:
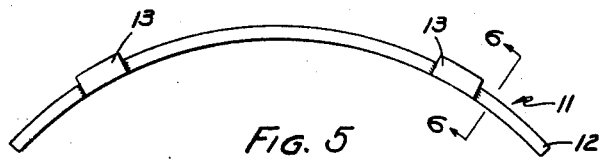
Fig. 5 is a side elevation of a jig which may be used to form the blank of Fig. 1.
Figure 6:
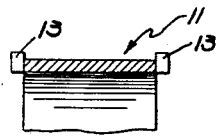
Fig. 6 is a vertical section on line 6—6 of Fig. 5.
Figure 15:
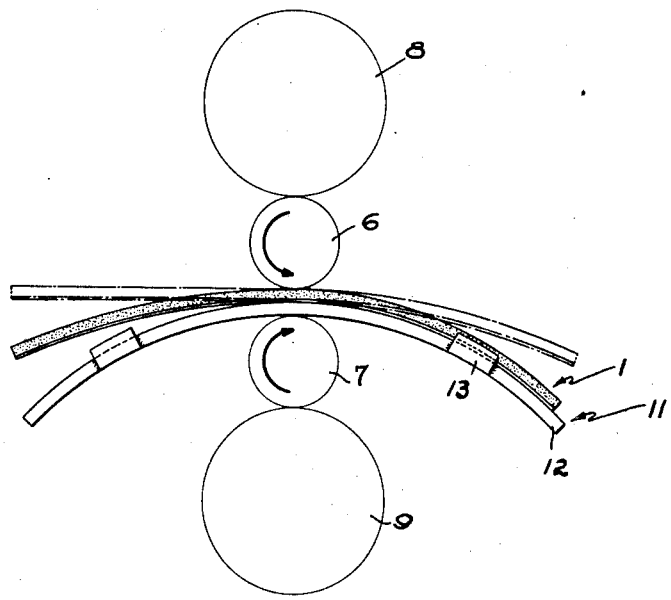
Fig. 15 is a diagrammatical illustration similar to that shown in Fig. 14, but illustrating the use of the jig of Figs. 5 and 6.

Fig. 15 illustrates the operation of the pressure rolls 6 and 7 when used in conjunction with a jig 11. The operation is essentially the same as that shown in Fig. 14 but the jig 11 serves to limit and control the bending of the bimetallic blank 1. This jig 11 is illustrated in Figs. 5 and 6 and is shown as comprising a strong, solid metal cylindrical member 12, preferably of steel, to which are welded tabs or lugs 13 which cooperate with the member 12 to define a partial channel for reception of the bimetallic blank. The lugs can be omitted or could be continuous, if desired, to form a complete channel. Obviously, the cylindrical member 12 has an outer surface whose radius of curvature is substantially equal to the inside radius of the desired curvature of the backing member 2 of the bimetallic blank 1.

Figure 8:
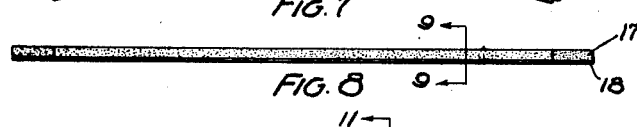
Fig. 8 is a side elevation of the blank of Fig. 7.
Figure 9:
Fig. 9 is a vertical section on line 9—9 of Fig. 8.
Figure 10:
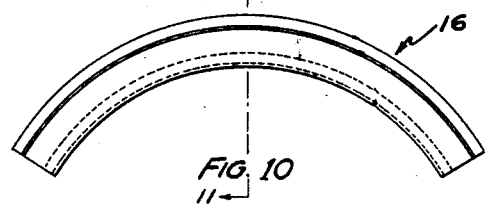
Fig. 10 is a side elevation of the blank of Figs. 7 to 9 after it has been formed to conical shape in accordance with the teachings of my invention.
Figure 11:
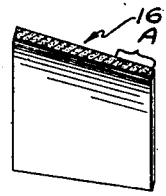
Fig. 11 is a vertical section on line 11—11 of Fig. 10.

The invention is applicable to the formation of conical shapes as well as the cylindrical shape of Fig. 4. Thus, the arcuate flat segment 16 of Figs. 7, 8, and 9 having the steel backing 18 and sintered facing 17 integrally bonded thereto may be formed to the conical shape shown in Figs. 10 and 11 by passing the same between the pressure rolls 6 and 7. The conical shape is achieved by adjusting the pressure-applying means of the rolls so that the pressure applied by the rolls increases in amount across the segment, the area generally included by the bracket A of Figs. 7, 9, and 11 receiving the greater pressure. This greater pressure results in greater working of that portion of the facing and consequent greater degree of bending.

Figure 7:
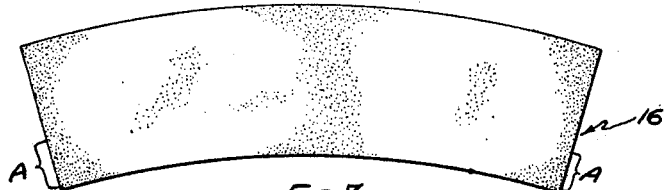
Fig. 7 is a plan view, on a reduced scale, of an arcuate, flat bimetallic blank suitable for forming articles of conical configuration.
Figure 12:
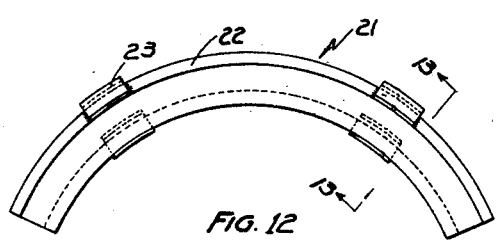
Fig. 12 is a side elevation of a suitable jig which may be used in shaping the blank of Figs. 7 to 9.
Figure 13:
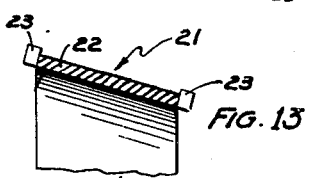
Fig. 13 is a vertical section on line 13—13 of Fig. 12.

Figs. 12 and 13 illustrate a conical jig 21 corresponding to the cylindrical jig 11 of Figs. 5 and 6 but for use with the arcuate segment 16 of Fig. 7. This jig 21 has a conical steel member 22 to which are welded spaced side lugs 23 to define a partial channel for reception of the blank 16. Thus, if this jig 21 and the bimetallic blank 16 are passed between the pressure rolls 6 and 7 as shown in Fig. 15, the blank will be formed to a conical shape if the rolls are urged toward each other with a pressure that increases along the length of the rolls. This will be further dealt with below.

Figures 16, 17, 18:
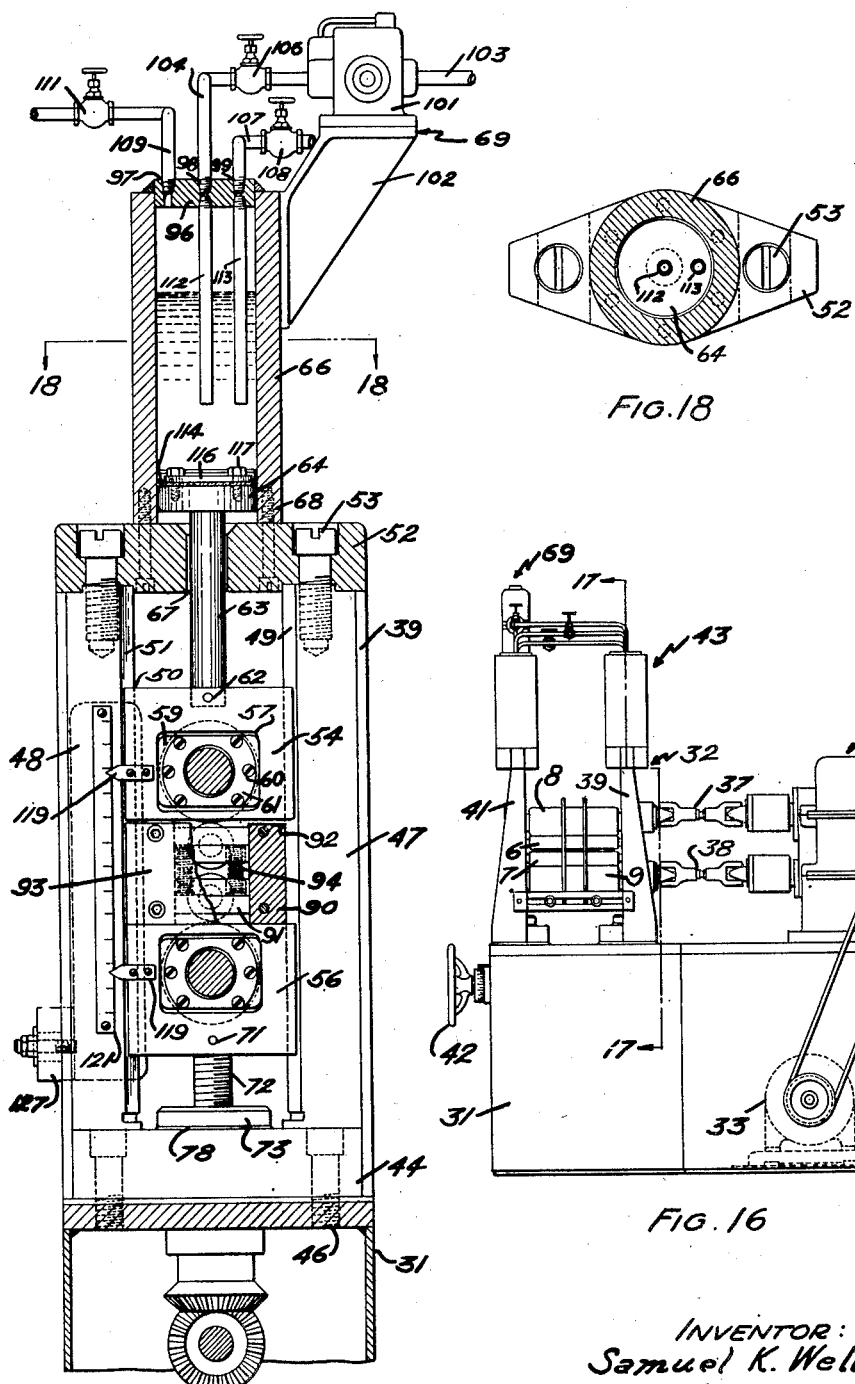
Fig. 16 is a front elevation of suitable apparatus for carrying out the invention.
Fig. 17 is a vertical section on line 17—17 of Fig. 16 but on an enlarged scale.
Fig. 18 is a horizontal section on line 18—18 of Fig. 17.

Referring now to Figs. 16 through 19, I have illustrated one suitable form of apparatus for achieving the above desired results. Fig. 16 generally shows the apparatus as comprising a base 31 on which is located the roll unit generally indicated at 32. Disposed within the base 31 is a motor 33 which drives a gear reduction unit 34 through a belt 36. The gear reduction unit 34 is coupled to the backing and drive rolls 8 and 9 of the roll unit 32 by means of the power-driven telescoping shafts 37 and 38 provided with universal joints to permit vertical adjustment of these rolls. The roll unit 32 comprises side frames 39 and 41 which support the bearing blocks for the backing rolls 8 and 9 and the pressure rolls 6 and 7. All of the rolls are mounted for vertical movement, the lower rolls being adjusted by means of the handwheel 42 and the upper rolls by means of a pressure-applying system 43, all as will be described in greater detail hereinafter.

Figure 19:
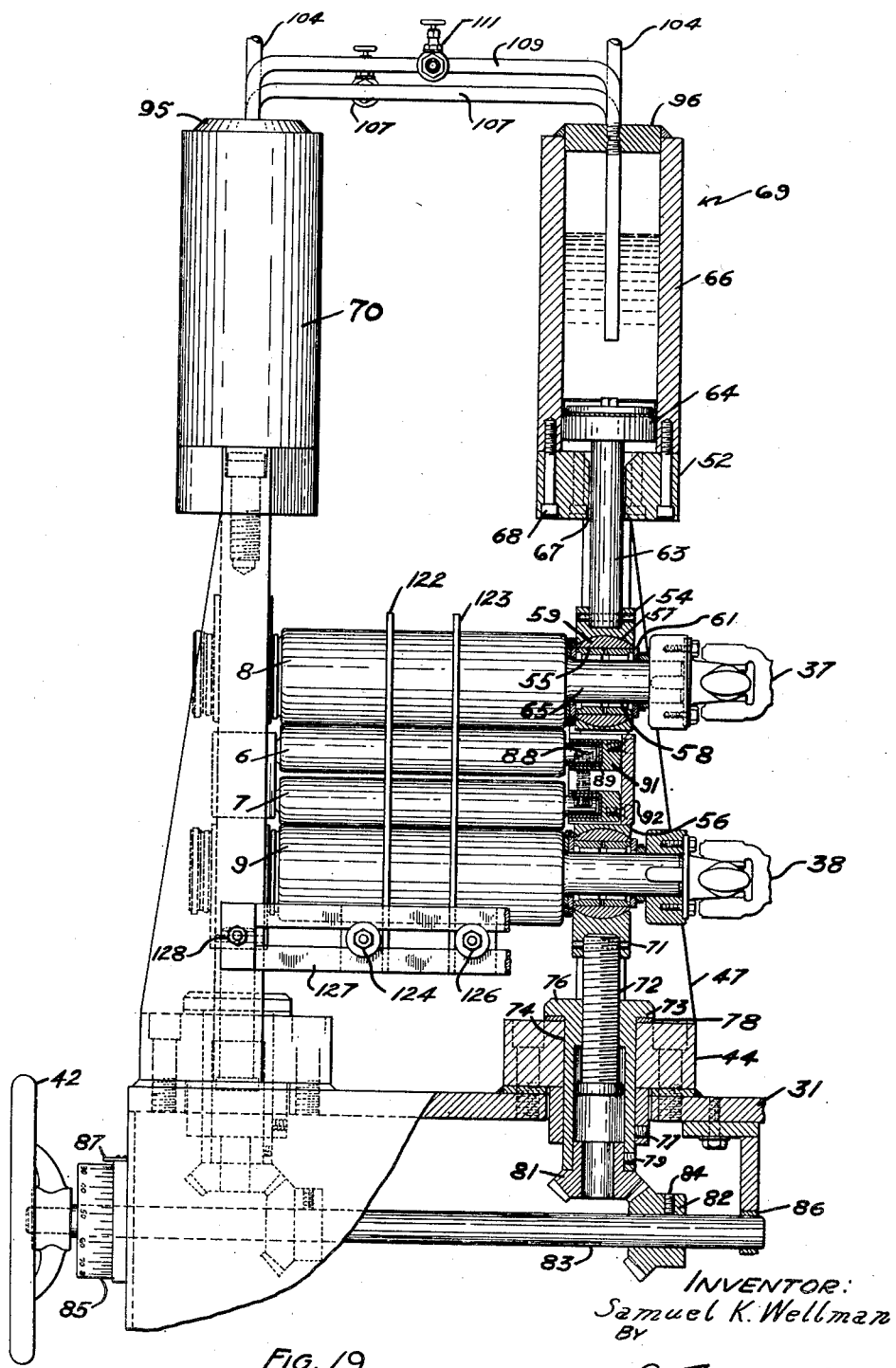
Fig. 19 is a front elevation of the apparatus of Fig. 17 with parts broken away and parts in section.

As shown in Fig. 17, the side frame 39 comprises a lower base member 44 which is bolted at 46 to the base 31. Extending upwardly from the base member 44 are spaced vertical side members 47 and 48 provided on their opposing faces with vertical shoulders 49 and 51 which cooperate to form a guide or slideway 50. A thick plate 52 spans the upper ends of the side members 47 and 48 and is bolted thereto at 53. Disposed between the side members 47 and 48 are two bearing blocks 54 and 56, each of which is provided with channels for engagement with the shoulders 49 and 51 of the guide 50 so that the blocks may be moved vertically. The upper block 54 is provided with an opening 57 for reception of the holder for the bearing for the roll 8. As shown in Fig. 19, this opening 57 has upper and lower boundaries of cylindrical configuration. A bearing holder 59 having cylindrical upper and lower faces is mounted in the opening 57. A needle bearing 58 is mounted in an opening 55 in the holder 59. A cover plate 61 secured to the holder 59 by screws 60 serve to retain the bearing in place. The bearing 58 is provided with the usual packing and rotatably receives the neck or reduced portion 65 of the roll 8. By this means, the end of the roll 8 is mounted for free rotation in the bearing block 54. The cylindrical mounting of the holder 59 permits tilting of the roll and the bearing with respect to the bearing block 54. The lower bearing block 56 is of the same construction as the upper and need not be described.

The upper bearing block 54 is secured by a pin 62 to a piston rod 63 which is integral with a piston 64 disposed in the pressure cylinder 66, the piston rod 63 extending through an opening 67 in the top plate 52 of the frame 39. The cylinder 66 is bolted at 68 to the top plate 52 and is provided at its upper end with fluid pressure supply means generally indicated at 69 and which will be described hereinafter.

The lower bearing block 56 is secured by a pin 71 to a threaded shaft 72 which threadably engages a rotatable nut 73 mounted in the base 44. As shown in Fig. 19, this nut 73 is rotatably received in an opening 74 in the base 44 and is held against vertical movement with respect thereto by means of the upper flange 76 and a lower set collar 77, a thrust washer 78 being disposed between the flange 76 and the top of the base 44. Secured to the lower end of the nut 73 by means of a setscrew 79 is a bevel gear 81 meshing with a second bevel gear 82 secured to the shaft 83 by means of a setscrew 84. This shaft 83 is suitably mounted in bearings 86 in the base 31 and is provided at its outer end with a handwheel 42. A graduated collar 85 is secured to the shaft 83 adjacent the handwheel 42 for cooperation with a pointer 87 secured to the base 31 for indicating the extent of rotation of the shaft 83 and the vertical position of the roll 9.

I have described specifically the side frame 39 of the roll unit 43 and the mounting therein of the backing rolls 8 and 9. It is apparent from Fig. 19 that the other side frame 41 is similarly constructed and has a pressure cylinder 70 corresponding to cylinder 66 and that it need not be described in detail. From the above, it is evident that the upper backing roll 8 is moved vertically by means of the piston rods 63 and that the lower backing roll 9 is moved vertically by turning the handwheel 42. The upper backing roll 8 is independently mounted in that either end may be adjusted. The lower backing roll 9 is not so mounted in that rotation of the handwheel 42 causes the bearing blocks at each end of the roll to move vertically at the same rate. However, the lower roll may be independently adjusted by disconnecting the coupling of one bearing block to the shaft 83 as by loosening a setscrew 84.

Disposed between the rolls 8 and 9 are the pressure rolls 6 and 7. Referring now to Fig. 19, each end of each pressure roll is provided with a reduced portion or neck 88 for mounting in a bearing 89 carried by a bearing holder 91. These bearing holders 91 comprise flat blocks slidably received in a large bearing block 92 which is mounted for movement between the shoulders 49 and 51 of the guide 50. The bearing block 92 comprises flat vertical side plates 90, held in spaced relation by the plates 93, which form short vertical guides for the bearing holders 91. A pair of springs 94 is disposed between the bearing holders 91 of the rolls 6 and 7 to urge the rolls apart and into engagement with the respective backing rolls. By this construction, the bearing holders 91 of the rolls 6 and 7 are slidable vertically in the bearing block 92 which in turn is slidable vertically in the guide 50.

The pressure supply unit 69 for the upper roll 8 will now be described. Referring now to Figs. 17 and 19, it will be seen that the upper end of the cylinders 66 and 70 are closed by means of cylinder heads 95 and 96 welded thereto. Each head is provided with threaded openings 97, 98, and 99 for reception of fluid supply and discharge pipes. A hydraulic pump 101 is mounted on a support 102 secured to the upper end of the cylinder 66. This pump has a supply pipe 103 connected between the pump and a suitable reservoir of liquid such as oil. A bifurcated exit or pressure pipe 104 extends from the pump 101 and has its bifurcated ends threaded into the openings 98 of the cylinder heads 95 and 96, a valve 106 being disposed in this line adjacent the pump. A bifurcated pipe 107 has its bifurcated ends threaded into the openings 99 of the cylinder heads 95 and 96 and communicates through the valve 108 with a place of discharge which may be the same reservoir to which the inlet 103 of the pump is connected. Another bifurcated pipe 109 is threaded into the openings 97 of the cylinder heads 95 and 96 and communicates through a valve 111 with a source of air or other gas under pressure. Disposed on the lower side of each cylinder head 95 and 96 are pipes 112 and 113 which thread into the threaded openings 98 and 99, respectively, and serve to insure that the inlet and outlet of the liquid in the cylinders 66 and 70 will be below the liquid level.

It is apparent from this description and from Figs. 16 and 19 that the pressure supply to the cylinder 66 on the right side of Fig. 19 is interconnected with that of the pressure supply of the cylinder 70 on the other side of the machine so that the same pressure is applied to both pistons. Thus, from the respective valves 106, 108, and 111, the pipes 104, 107, and 109 are bifurcated, and connect both cylinders with the same valves.

Each cylinder 66, 70 has a piston 64 which is provided on its upper side with a cup-shaped gasket 114 secured thereto by means of the plate 116 and bolts 117 and on its lower side with a rod 63 for attachment to the adjacent bearing block of the roll 8.

The bearing blocks 54 and 56 on each end of the machine are provided with pointers 119, see Fig. 17, for cooperation with a scale 121 secured to the side members 48 to indicate the degree of spacing apart of the rolls. These together with the graduated collar 85 secured to the shaft 83 of the handwheel 42 serve as indicators of the position of the rolls.

Disposed at the front of the roll unit 32 are vertical plates 122 and 123, see Fig. 19, which serve not only as entering guides for insuring that a blank is fed into the rolls at right angles thereto, but also as protecting guards for the operator. These plates are adjustably bolted at 124 and 126 to a slotted cross bar 127 bolted at 128 to the side members 39 and 41 of the unit. The slot in the cross bar 127 serves to permit adjustment of the spacing apart of the plates 122 and 123 to accommodate various widths of articles to be rolled.

The operation of the device will now be described. As an example, it will be assumed that it is desired to bend a bimetallic article having a width of about 3¼", a facing thickness of about ⅛", a backing thickness of about 1/16", and a length of about 12" to a cylindrical curvature about 12" in diameter. The operator will adjust the lower backing roll 9 by means of the handwheel 42 so that it is in an intermediate position substantially as shown in Fig. 19. He will then adjust the pressure applied to the upper roll so as to attain the required amount of mechanical working of the article on passage through the rolls. In the specific example illustrated using pressure rolls 6 and 7 having a diameter of about 2" and cylinders 66 and 70 having an inside diameter of 4", he will adjust the pressure in the cylinders, in a manner further described below, so that it is in the neighborhood of 700 pounds per square inch in the cylinders. He will then start the motor 23 to rotate the rolls and will pass the blank between the pressure rolls 6 and 7. For the article in the example, the peripheral speed of the rolls should be about 12 feet per minute. Although it is possible to achieve the required bending in one pass through the rolls by using a high pressure, it is preferred that two or three passes will be required, much in the manner illustrated in Fig. 14. The indicated pressure is such as to require several passes. The use of several passes results in gradual bending and in the complete elimination of cracking and chipping of the sintered facing.

The manner in which the controlled pressure is applied is one important feature of my invention. It is apparent from the above description of the apparatus that the cylinders 66 and 70 are connected to sources of not only a gas, such as air, under pressure, but also a liquid, such as oil, under pressure. The purpose of the liquid is to provide the pressure and to control the degree of cushioning effect obtained by the air. This may be made clearer by the following description of the procedure to be followed by the operator.

With each cylinder containing oil to the level shown in Fig. 17 and with all valves closed, the operator will open air-supply valve 111 to admit air under pressure to the cylinder 66. The pressure of this air will be relatively low or about 90 pounds per square inch and is readily obtained. He will then close the air supply valve 111, open the oil supply valve 106 and start the pump 101 and allow it to continue pumping until a pressure of about 700 pounds per square inch is achieved in the cylinder 66. At this time, he will close the oil supply valve 106 and stop the pump. The air in the cylinder 66 will be compressed under a pressure of 700 pounds per square inch and will exert this downward pressure on the piston 64 and through the piston rod 63 to the upper backing roll 8. As a result of this, the pressure on the upper pressure roll 6 will be relatively constant regardless of the thickness of the blank and spacing apart of the pressure rolls 6 and 7. The presence of the air in the cylinders gives a cushioning effect and permits the pressure rolls to adjust for any differences in thickness and density of the article.

The provision for the supply of oil under pressure is advantageous in that it permits the cushioning effect to be varied. By using a lower oil level, more air will be trapped in the cylinder and the cushioning of the upper roll will be greater. By using a higher oil level, less air will be present and the cushioning effect on the roll will be less and a stiffer action obtained. The oil is also advantageous in that it is mechanically more feasible to produce and maintain high oil pressures than it is to produce and maintain high air pressures.

The introduction of gas under pressure through the valve 111 and pipe 109 is necessary only to permit an adjustment of the level of the liquid in the cylinders 66 and 67. That is, pressure is necessary to force the liquid up the exhaust pipe 113 and out through the valve 108 to the reservoir. If a discharge pump or siphon were provided to permit removal of the oil through the pipe 113, it would be sufficient to merely have the valve 111 communicate with atmospheric air.

It is apparent that when air is introduced into the expansible chamber formed by cylinder 66 (or 70) and piston 64 in the manner which has been described, the chamber will contain a definite predeterminable mass of air which will be maintained indefinitely by the hermetic character of the cylinder walls and the liquid seal above the piston.

While I have illustrated a machine having two pressure rolls and two backing rolls which are power driven and in turn drive the pressure rolls, it is to be understood that other forms of apparatus may be utilized. Thus, it is possible to operate the machine with the pressure rolls removed. This can readily be accomplished by disassembling and removing the bearing blocks 92 for the pressure rolls and removing them and the rolls from the machine. Then, the backing rolls 8 and 9 can be used directly as pressure rolls. Similarly, while both rolls 8 and 9 are shown as power driven, it is obvious that only one need be so driven and that the other can be an idle roll.

For some purposes, it may be desirable to conduct the bending operation with the blank heated to an elevated temperature. However, such procedure necessitates the provision of a protective atmosphere to prevent oxidation of the blank and is not necessary for most materials and conditions. For all practical purposes, the bending operation may be conducted with the blank at room temperature, and I have successfully bent articles having a facing thickness varying from 1/64" to ½".

In the above description, I have referred to the blank as having lateral and longitudinal dimensions and as being fed longitudinally between the pressure rolls or with its length disposed in the direction of movement. This has been done for purposes of illustration only, since the direction of bending is independent of the flat dimensions of the blank and is controlled solely by the direction in which successive lateral areas are progressively mechanically worked. Thus, by the term "longitudinal," I refer only to the direction of the progressive mechanical working and by the term "lateral," I refer to a direction at right angles to this. In other words, if the flat blank 1 of Figs. 1 to 3 is passed between the pressure rolls with its length parallel to the axis of the rolls, the bending will be in a plane having an axis parallel to the lengthwise center line of the blank.

The above description and examples are regarded as illustrative only in order to more clearly describe the invention and it is contemplated that there are numerous modifications and changes which may be made without departing from the spirit of the invention or the scope of the appended claim.

This application is a division of application Serial Number 555,116, filed September 21, 1944, now Patent No. 2,607,246, issued August 19, 1952.

I claim:

Apparatus for bending laminated bimetallic articles to a predetermined curved shape comprising a supporting structure; a pressure roll rigidly supported in the said structure for rotation about a fixed axis; a second cooperating pressure roll; bearing means for the second roll slidably supported in the said structure for movement toward and away from the fixed axis roll while maintaining the axis of the second roll in a fixed plane through the axis of the other roll; means for rotating at least one of said rolls; means urging the second roll toward the other roll comprising an expansible chamber having a fixed wall part rigidly mounted on the said supporting structure and a movable wall part mechanically connected to the second pressure roll; and means for introducing and maintaining pressure fluid in the expansible chamber comprising a source of gas under low pressure connected to said chamber and a source of liquid under high pressure connected to said chamber, whereby low pressure gas first admitted to the said chamber can be compressed therein by liquid thereafter admitted.

SAMUEL K. WELLMAN.

References Cited in the file of this patent

UNITED STATES PATENTS

| Number | Name | Date |
|---|---|---|
| 145,129 | Sellers | Dec. 2, 1873 |
| 1,030,865 | Blakesley | July 2, 1912 |
| 1,367,015 | Browne | Feb. 1, 1921 |
| 1,547,250 | Wilson | July 28, 1925 |
| 1,729,410 | Young | Sept. 24, 1929 |
| 1,776,436 | Iversen | Sept. 23, 1930 |
| 1,980,570 | Biggert | Nov. 13, 1934 |
| 2,101,266 | Munson | Dec. 7, 1937 |